Patented Mar. 11, 1952

2,588,784

UNITED STATES PATENT OFFICE 2,588,784

ANION EXCHANGE RESINS FROM ALKYLENE POLYAMINE META PHENYLENE DIAMINE, FORMALDEHYDE AND ACETONE

Donald Whittaker and Graham George Allen, Northwich, England, assignors to Imperial Chemical Industries Limited, a corporation of Great Britain No Drawing. Application January 9, 1950, Serial No. 137,668. In Great Britain January 12, 1949

7 Claims. (Cl. 260—64)

This invention relates to the manufacture of resins having improved anion exchange properties, more particularly to resins of high exchange capacity which are hard and do not swell on absorbing acid.

Anion exchange resins can be made by the reaction of metaphenylene diamine with formaldehyde and, if desired, an alkylene polyamine to give increased basicity. This reaction must be carried out in presence of hydrochloric acid in acid-resistant vessels, and although the resins are hard and are obtained in high yield they are of low exchange capacity—not more than 0.5 milliequivalent of acid per cc. of resin. Furthermore, the resins are obtained in the form of a salt and must be regenerated by alkali before use.

Anion exchange resins can also be made by the reaction of a polyalkylene polyamine with formaldehyde and a ketone. The resins so obtained have an exchange capacity up to 1 milliequivalent of acid per cc. and the yield obtained is of the order of magnitude of 50% of the weight of anhydrous reactants, but they are weak, soft, rubbery gels which do not withstand much use.

They can also be made by the reaction of alkylene polyamines with chlorinated paraffin wax, which gives a good yield of hard resin of high exchange capacity; but the resin swells during acid absorption—sometimes by as much as 40%. This swelling is objectionable because it tends to disintegrate the resin granules and causes a gradual increase in the pressure drop through the absorption column which is a nuisance in practice.

We have found that we can make considerably improved products having a high anion exchange capacity per unit volume, which are hard, durable, and free from swelling by reacting an alkylene polyamine, formaldehyde, actone and a little metaphenylene diamine. Furthermore, these improved resins are obtained in high yield.

We have also discovered that resins made in the aforesaid manner can be still further improved by substantially increasing their water-insolubility. This is done by treating the resin with formaldehyde by a process which comprises soaking it with aqueous formaldehyde preferably at 10°–40° C., for several days, and then removing the resin and washing with water.

The proportions which give the best products are 10 parts of alkylene polyamine (generally containing from 15% to 40% of water), from 2 to 6 parts of acetone, from 1 to 3 parts of metaphenylene diamine, and from 5 to 15 parts of 40% aqueous formaldehyde or the formaldehyde equivalent thereto, all parts being by weight. A small proportion of metaphenylene diamine used in this way increases the yield, hardness, resistance to swelling, and packing density of the product; and although it decreases the exchange capacity per unit weight, it does not alter the exchange capacity per unit volume of resin, which is much more important. Smaller proportions of metaphenylene diamine do not give the full benefits of the invention; for example, with only ½ part instead of 1–3 parts in the above mixture the resin is too soft to withstand use. On the other hand, with 5 parts instead of 1–3 parts, the exchange capacity of the resin is below 1 milliequivalent per cc. of resin.

The optimum results are obtained using 10 parts of alkylene polyamine which is predominantly tetraethylene pentamine and higher polyamines, dissolving therein 2 parts of metaphenylene diamine, adding 4 parts of acetone, and then while stirring adding 12 parts of 40% aqueous formaldehyde. A further quantity of formaldehyde is used during the subsequent treatment by which regeneration loss is minimised.

Other alkylene polyamines which may be used include ethylene diamine, diethylene triamine, triethylene tetramine, tetraethylene pentamine, tetramethylene diamine, polyethylene imine, and polyvinylamine, or mixtures thereof. Polyamines are generally available as aqueous mixtures and may be used as such. These mixtures generally contain some piperazine. Mixtures containing a larger weight of water than of amine, however, only react slowly and we prefer to avoid such amounts of water. The most effective alkylene polyamine for this process is made by reacting ethylene dichloride under pressure with a slight excess of aqueous ammonia over that equivalent to the chlorine, and isolating the amine so produced from the reaction mixture. Isolation can be carried out by adding caustic soda equivalent to all the chlorine introduced in the ethylene dichloride, distilling off unreacted ammonia and most of the water, extracting the amines from the residue with an organic solvent and distilling off this solvent. The extraction can also be carried out by centrifuging the sludge remaining after distilling off the ammonia. The resulting liquid contains a mixture of alkylene polyamines varying from ethylene diamine to tetraethylene pentamine and higher, with generally 10–30% of water.

The process is preferably carried out by dissolving the metaphenylene diamine in the polyamine, adding the acetone, and finally adding the formaldehyde. The reaction is exothermic, and by stirring the mixture in a kneading machine it quickly becomes sticky and then becomes a soft rubbery solid. After this mastication period, which should be continued until the mixture is reasonably homogeneous, the solid is left to age at ordinary temperatures for at least a day, which converts it to a hard rubber. It is then heated to a temperature above 100° C., preferably for between ¼ and 3 hours, to complete the reaction and evaporate off any volatile constituents. A temperature between 120° and 150° C. is preferred because this completes the reaction and then volatilises unreacted materials. On dropping the residue into water it disintegrates and any water-soluble portion dissolves, and the remaining resin is separated, washed and dried.

At this stage, the resin is an improvement over those hitherto available in respect of having an adequate hardness and high exchange capacity; but when it is subjected to a large number of cycles of anion absorption and regeneration with acid, a minor proportion of it either disintegrates or dissolves. In that respect it resembles existing commercial products, but we reduce this loss on regeneration by treatment with formaldehyde. The treatment consists of soaking the resin in 40% formaldehyde solution for several days, preferably 10–20 days, at room temperature. After this treatment, the regeneration loss during 25 regeneration cycles using 2% NaOH solution as regenerating liquid is approximately 6%, and during the next 25 regeneration cycles is only approximately 1%. Thus the average loss after 25 cycles is less than 0.05% per cycle, and the loss is progressively less on further use. In addition, the regeneration can safely be carried out with dilute caustic soda solution, whereas, the known resins are softened with such a strong alkali.

The products resemble hard rubber in mechanical properties. When tested as acid absorbers by treatment with N/100 sulphuric acid at 20° C., they have an exchange capacity of 6.5 to 7.5 milliequivalents of acid per gram, and a packing density of 0.16 to 0.23 gram per cc., so that their exchange capacity by volume is from 1.2 to 1.5 milliequivalents per cc. A further advantage of our anion exchange resins over those hitherto known is that the known resins tend to stick to any air bubbles which may get into the resin, and thus rise with the bubbles on backwashing, whereas the resins of our invention do not. They generally contain 20% to 25% of nitrogen. The yield of resin is from 55% to 65% of the weight of the anhydrous reactants.

The invention is illustrated but not restricted by the following examples in which all parts are by weight.

*Example 1*

375 parts of ethylene dichloride were heated in an autoclave under pressure in a bath at 120° C. with 3150 parts of aqueous ammonia containing 315 parts of NH₃. The pressure rose slowly at first, and then rapidly, and quickly fell again, and at this stage the autoclave was cooled and opened. 304 parts of caustic soda were added to the product, and ammonia distilled off. The water present was largely removed by fractional distillation and polyamines isolated by extraction of the sodium chloride residue with alcohol. The alcohol was boiled off. The liquid so prepared contained 215 parts of alkylene polyamines and 37 parts of water. 50 parts of metaphenylene diamine were dissolved in this liquid, 100 parts of acetone and 250 parts of 40% formaldehyde were added. The mixture was stirred and gradually became sticky, then granular, and it was masticated in a kneader for half an hour. It was then left to age for two days at room temperature and afterwards heated to 130° C. for an hour, and dropped into cold water, filtered, washed and dried. The yield was 300 parts of resin.

This resin was tested as an acid absorber by treatment with N/100 H₂SO₄ solution at 20° C., and showed an absorption of 1.3 milliequivalents of resin.

*Example 2*

The polyamine used in this example was made by reacting ethylene dichloride and ammonia as in Example 1, and was isolated by centrifuging off the solids precipitated during distillation of the ammonia. It contained 23% of water. 150 gms. of metaphenylene diamine were dissolved in 1000 gms. of polyamines and 400 ccs. of acetone were added. The mixture was well stirred and 1400 ccs. of 40% aqueous formaldehyde added slowly. A large amount of heat was evolved and the formaldehyde was added at a rate sufficient to maintain the mixture at just below its boiling point (80°–90° C.). Gradually the mixture because increasingly viscous and gel-like. The resin was removed from the reaction vessel, broken down to lumps of about 1 inch diameter and allowed to age at room temperature for 2 days. It was then heated for 2 hours at 130° C. and allowed to cool to room temperature before adding to cold water. The resin broke down to smaller particles in the water and water-soluble impurities were dissolved out. It was then ground and sieved so that it passed through a 12-mesh sieve and was retained on a 44 mesh B. S. S. sieve. A volume of 3.8 litres of wet resin was obtained of composition C=61.51%, H=8.95%, N=21.33%. This was soaked in 40% formaldehyde for 16 days to increase its hardness and diminish its solubility, and was finally washed free of excess of formaldehyde. The resin had a packing density of 0.21 gms./cc. and a capacity of 1.2 milliequivalents per cc. After 50 complete cycles of anion absorption and acid regeneration the bed volume appeared constant at a value 7% less than its original volume. A similar resin without formaldehyde treatment had lost 19% of its original volume after 50 cycles.

What we claim is:

1. Process for the manufacture of an anion exchange resin which comprises reacting 10 parts of alkylene polyamine containing up to 40% of water with from 2 to 6 parts of acetone, from 1 to 3 parts of metaphenylene diamine, and from 5 to 15 parts of 40% aqueous formaldehyde, all parts being by weight.

2. Process as claimed in claim 1 in which the alkylene polyamine is a mixture of ethylene polyamines, principally tetraethylene pentamine and higher polyamines.

3. Process for the manufacture of an anion exchange resin which comprises reacting together 10 parts of alkylene polyamine containing up to 40% water, 2 parts of metaphenylene diamine, 4 parts of acetone and 12 parts of 40% aqueous formaldehyde, all parts being by weight, the resin thus obtained being subsequently treated with a 40% aqueous formaldehyde solution.

4. Process for the manufacture of anion exchange resins of increased water insolubility which comprises treating the resin obtained from the process of claim 2 with a 40% aqueous formaldehyde solution for a period of from 10 to 20 days at a temperature between 10 and 40° C.

5. An anion exchange resin obtained by reacting together 10 parts of alkylene polyamine containing up to 40% of water, from 2 to 6 parts of acetone, from 1 to 3 parts of metaphenylene diamine, and formaldehyde equivalent to that contained in from 5 to 15 parts of 40% aqueous formaldehyde, all parts being by weight, said resin being characterized by having an absorption capacity exceeding 1 milliequivalent per cc., and an average loss on regeneration after 25 cycles of less than 0.05% per cycle.

6. A process for the manufacture of an anion exchange resin which comprises mixing together 10 parts of alkylene polyamine containing up to 40% of water, from 1 to 3 parts of metaphenylene diamine, from 2 to 6 parts of acetone and from 5 to 15 parts of 40% aqueous formaldehyde, masticating said mixture while the same solidifies, ageing the resulting solid for at least a day, heating said solid to a temperature above 100° C., mixing the same with water to remove water-soluble impurities, separating the water from said solid and thereafter drying the latter.

7. The process of claim 1, wherein the resin obtained by reaction of the alkylene polyamine, metaphenylene diamine, acetone and formaldehyde is rendered more water-insoluble by soaking with aqueous formaldehyde for a period of from 10 to 20 days at a temperature between 10 and 40° C.

DONALD WHITTAKER.
GRAHAM GEORGE ALLEN.

REFERENCES CITED

The following references are of record in the file of this patent:

UNITED STATES PATENTS

| Number | Name | Date |
|---|---|---|
| 2,223,930 | Griessbach | Dec. 3, 1940 |
| 2,259,169 | Little | Oct. 14, 1941 |
| 2,373,632 | Myers | Apr. 10, 1945 |
| 2,442,989 | Sussman | June 8, 1948 |